United States Patent
Gonsior

[19]

[11] Patent Number: 6,039,069

[45] Date of Patent: Mar. 21, 2000

[54] PIPE FITTING, IN PARTICULAR A CONTROL AND SHUT-OFF VALVE

[75] Inventor: Wolfgang Gonsior, Bodolz, Germany

[73] Assignee: XOMOX International GmbH & Co., Lindau/Bodensee, Germany

[21] Appl. No.: 09/095,510

[22] Filed: Jun. 11, 1998

[30] Foreign Application Priority Data

Jun. 11, 1997 [DE] Germany .............. 197 24 549

[51] Int. Cl.[7] ............................................. F16K 1/22
[52] U.S. Cl. .......................... 137/454.2; 251/305
[58] Field of Search ................ 137/454.2; 251/305

[56] References Cited

U.S. PATENT DOCUMENTS

| | | | |
|---|---|---|---|
| 4,587,990 | 5/1986 | Pennell et al. | 137/454.2 |
| 4,606,368 | 8/1986 | McCafferty | 137/454.2 X |
| 5,005,545 | 4/1991 | Wendel et al. | 137/454.2 X |
| 5,462,080 | 10/1995 | Plavidal et al. | |

FOREIGN PATENT DOCUMENTS

| | | |
|---|---|---|
| 640 784 | 3/1995 | European Pat. Off. . |
| 2672657 | 8/1992 | France . |
| 195 08 789 | 2/1996 | Germany . |

*Primary Examiner*—John Fox
*Attorney, Agent, or Firm*—Evenson, McKeown, Edwards & Lenahan, P.L.L.C.

[57] ABSTRACT

A pipe fitting, especially a control and shut-off valve, including a housing (2) and a shut-off element (18) which can rotate on an axis, wherein the housing (2) contains connection members, especially pipe nipples (4, 5) for connection to a pipeline. The fitting enables a quick replacement of worn parts to be performed with ease. The housing (2) is configured as an outer housing with a cavity (8), and an inner housing receiving the shut-off means (18) is provided, which is disposed in the cavity (8) and is releasably joined to the outer housing (2).

19 Claims, 2 Drawing Sheets

PIPE FITTING, IN PARTICULAR A CONTROL AND SHUT-OFF VALVE

BACKGROUND OF THE INVENTION

The invention relates to a pipe fitting, especially a control and shut-off valve, comprising a housing and a shut-off element, which preferably is rotatable about an axis, the housing being provided with means, preferably in the form of pipe nipples, for connecting the fitting to a pipeline.

Published German Patent Application No. DE 195 08 789A discloses a shut-off pipe fitting which is configured as a so-called "top-entry" ballcock. The spherically shaped shut-off means is flattened on the top and/or bottom such that it can be introduced into the housing through an opening in the latter. Then the shut-of means is rotated about an axis to the installed position, the said axis being substantially orthogonal to the axis about which the shut-off member can be rotated in the installed position for shutting off and/or releasing the medium flowing through a connected pipeline. This configuration assumes an at least approximately spherical shut-off means and cannot easily be used in cocks having tapered plugs.

Pipe fittings already installed in pipelines, especially welded pipe fittings, require considerable effort in case of repairs or replacement. Complex assembly work, special tools and special jigs are regularly necessary in order to replace or repair worn parts. Known valves whose housings are welded into the pipe have to be removed from the latter and welded back into it after repairs. Furthermore, practice shows again and again that, during installation or during the placement in operation of pipelines, damage is done to the seals, especially by the flushing operations, thereby considerably shortening their life.

SUMMARY OF THE INVENTION

Setting out from this situation, is the object of the invention to provide an improved pipe fitting of the aforementioned kind which will facilitate quick and easy replacement of worn parts.

It is also an object of the invention to provide a pipe fitting which will not require complicated assembly operations, special tools or special jigs.

Another object is to provide a pipe fitting which has a functional design and can be produced without great expense.

These and other objects are achieved in accordance with the present invention by providing a pipe fitting configured as a control or shut-off valve, comprising a housing and a shut-off element pivotable about an axis, said housing comprising means for connecting the fitting to a pipeline, and said housing being configured with an outer housing defining a cavity, and an inner housing which receives the shut-off element and is disposed in said cavity, said inner housing being releasably joined to said outer housing.

The pipe fitting according to the invention, which is designed especially as a control and shut-off valve, contains an outer housing and an inner housing with the functional parts and parts subject to wear such as the valve body, valve seat, bearings and the like. The outer housing is joined sealingly and permanently to the pipe, preferably by welding. The inner housing is inserted into a preferably tapered opening or cavity in the outer housing and is likewise sealingly joined to the latter. Between the inner and outer housing a releasable connection is provided, and leakage of the medium from the fitting into the exterior is prevented by seals. A high quality seal against the exterior is achieved and, in comparison to previously known designs, a reduction of potential leakage is accomplished. A quick and easy replacement of working parts and parts subject to wear is assured, since it is necessary only to remove the inner housing from the outer housing. No severing work and/or welding operations are necessary, so that the use of the pipe fitting according to the invention is advantageous especially in areas where there is any danger of explosion. Before replacement the inner housing with the working parts and parts subject to wear is checked for compliance with requirements, thus assuring complete functionality after it is installed. To perform service or repairs the inner housing is removed from the outer housing which remains still attached to the pipe. If the pipe fitting is a control and shut-off valve, the inner housing thus comprises a completely interchangeable valve unit.

The pipe fitting according to the invention is highly leakage-resistant and can also advantageously be designed in a double-jacketed version, in order especially to permit heating or monitoring for leakage. In the installation of the pipe fitting it is preferable first to join the outer housing to the pipe, it being desirable to close with a blank cover the opening provided for the inner housing. Thus, before installing the inner housing that contains the shut-off element and parts subject to wear, the pipeline can be flushed out, in which case obviously no harm can be done to the seals, especially. Not until the pipeline is completely set up is the inner housing inserted into the outer housing and affixed to it. Thus there is a separation in time between the preparation of the outer housing and the installation of the inner housing with its working parts and parts subject to wear.

Other aspects of the invention will be apparent from the following description and claims.

BRIEF DESCRIPTION OF THE DRAWINGS

The invention will be explained in further detail below with reference to preferred embodiments shown in the accompanying drawings, without thus placing any limitation on the invention. In the drawings.

DETAILED DESCRIPTION OF PREFERRED EMBODIMENTS

Figure 1:
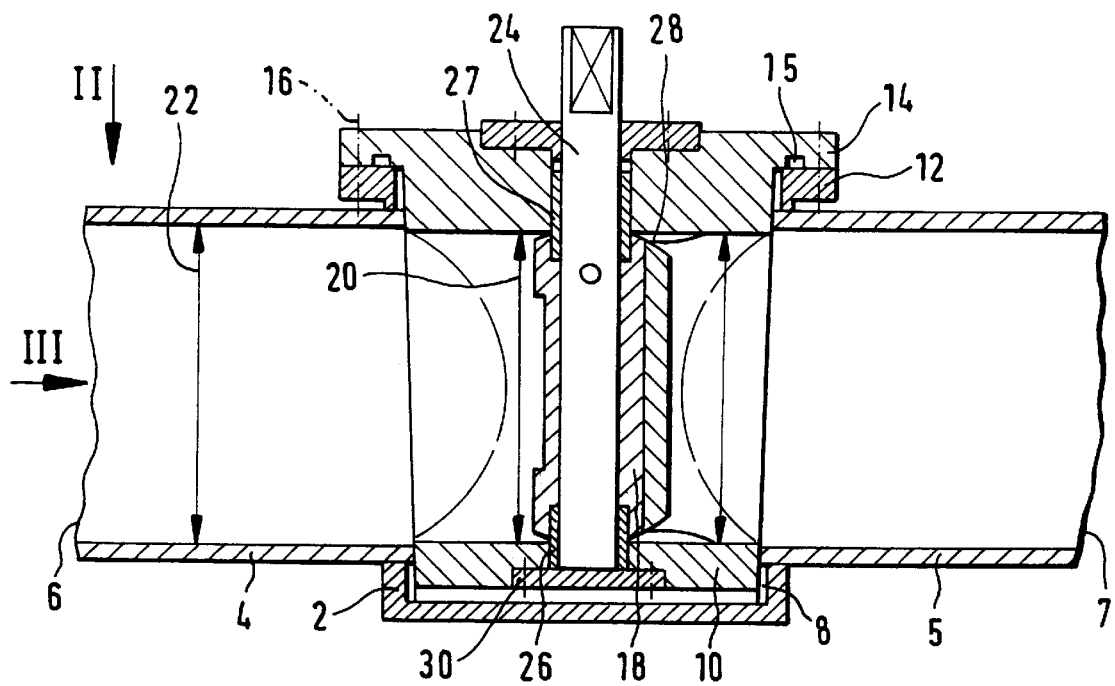
FIG. 1 shows an axial section through a pipe fitting according to the invention configured as a control and shut-off valve.

FIG. 1 shows a longitudinal sectional view of a control and shut-off valve with an outer housing 1 which contains couplings for connection to a pipeline not further represented. The couplings in the illustrated embodiment are in the form of two pipe nipples 4 and 5 which are preferably joined by welding to the outer housing 1. Alternatively the couplings can be constructed in the form of flanges, threaded couplings or the like. The free ends 6 and 7 of the pipe nipples are advantageously designed for welding into a pipeline which is not shown in further detail here. The outer housing 2 contains a cavity 8 into which an inner housing 10 can be inserted. The outer housing 2 has at the upper end of the cavity or the opening thereof a flange 12 which fits within a corresponding flange 14 of the inner housing. As indicated by the broken line 16, a releasable, sealing junction is thus created between outer housing 2 and inner housing 10. The connection to the pipeline is provided through the outer housing, while the inner housing contains the fitting's working parts and parts subject to wear. By opening the connection, especially the flange connection 12, between the outer housing 2 and inner housing 10, the latter can be removed without any manipulation on the pipeline, so that replacement or service operations can be performed with a minimum of difficulty. For sealing between the inner and outer housing a soft gasket, of polytetrafluoroethylene (PTFE), graphite or the like, is provided preferably between the flanges 12 and 14. For this purpose one of the flanges, flange 14 in the drawing, contains a chamber 15 to receive such a soft gasket.

The inner housing 10 contains the shut-off element 18, which is in the form of a gate. The inner housing 10 with the shut-off element 18 are subject to existing pipe fitting design principles, and it is not important whether the shut-off element is a gate, cock, ball or the like. The cavity 8 in the outer housing 2 is advantageously tapered, and the associated external shape of the inner housing 10 is correspondingly tapered to match it. Thus the inner housing 10 is sealingly inserted into the tapered cavity 8, largely avoiding dead space for the flowing medium. As can be seen, the cavity 8 is preferably tapered over its entire height. Additionally or alternatively the inner housing 10, aside from the upper connecting flange 15, is of conical configuration through its entire height. Furthermore, mainly to avoid dead space, the inside diameter 20 of the inner housing 10 is substantially equal to the inside diameter 22 of the pipe nipples 4 and 5 of the outer housing.

The inner housing 10 contains the working parts and parts subject to wear, such as especially, the already mentioned gate 18 and its stem 24, as well as their bearings 26 and 27. Also, the inner housing 10 contains the seat 28 for the shut-off element or gate 18, which is orthogonal to the plane of drawing. The lower bearing 26 of valve stem 24 is provided with and closed off by a bearing cover 30. Sealing means are provided in a known manner where the upper end of the stem exits.

Figure 2:
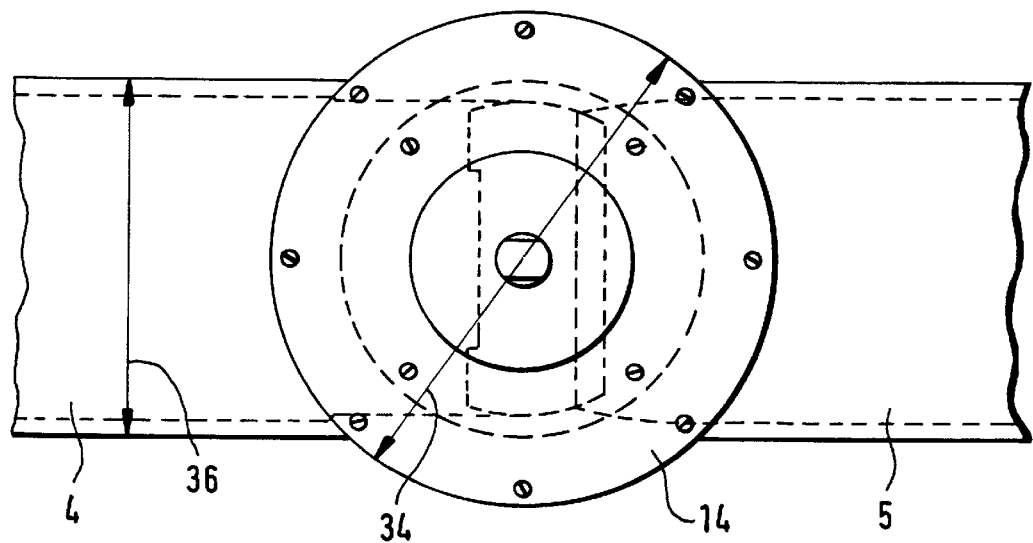
FIG. 2 shows a top plan view in the viewing direction II in FIG. 1.

FIG. 2 shows a top view in which the flange 14 of the inner housing can easily be seen. The flange 14 has a diameter 34 and is only slightly larger than the outside diameter 36 of the pipe nipples 4 and 5. The diameter 34 of flange 14 is preferably larger by a given factor than the outside diameter 36. This factor preferably ranges between 1.1 and 2.5, particularly preferably between 1.2 and 2. A factor having a magnitude between 1.3 and 1.6 times the outside diameter has proven advantageous. According to the invention the proposed pipe fitting thus has a compact structure and requires little space for its installation and accommodation.

Figure 3:
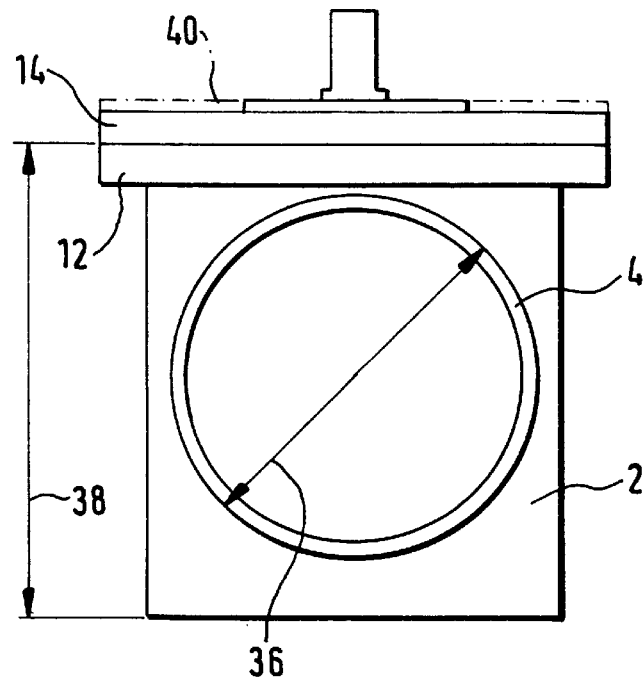
FIG. 3 shows a view taken in direction III of FIG. 1.

FIG. 3 shows the pipe fitting in an axial elevation with the outer housing 2 which advantageously has a basically rectangular or quadratic external shape and has the flange 12 at the top in the drawing. The outer housing 2 has a height 38 which is only slightly greater than the diameter 36 of the pipe nipple 4. The height 38 of the outer housing is greater by a factor ranging between 1.1 and 1.8, preferably between 1.2 and 1.6, than the outside diameter 36 of the pipe nipple 4. As can be seen, the pipe fitting according to the invention is of compact dimensions and neither at the bottom nor at the top in the drawing does it protrude in the junction area substantially above the pipe nipples and accordingly above the connected pipes.

A blank cover 40 is indicated by a broken line. This blank cover 40 can be joined to the outer housing 2 instead of the inner housing 10 or its flange 14. Preferably the outer housing 2 is first connected to the pipe without the inner housing 10, and then when the pipeline is been checked by flushing or the like, the inner housing and especially its working parts and parts subject to wear are not affected. In accordance with the invention, the inner housing is not installed until after the apparatus has been assembled or installed and cleaned.

Figure 4:
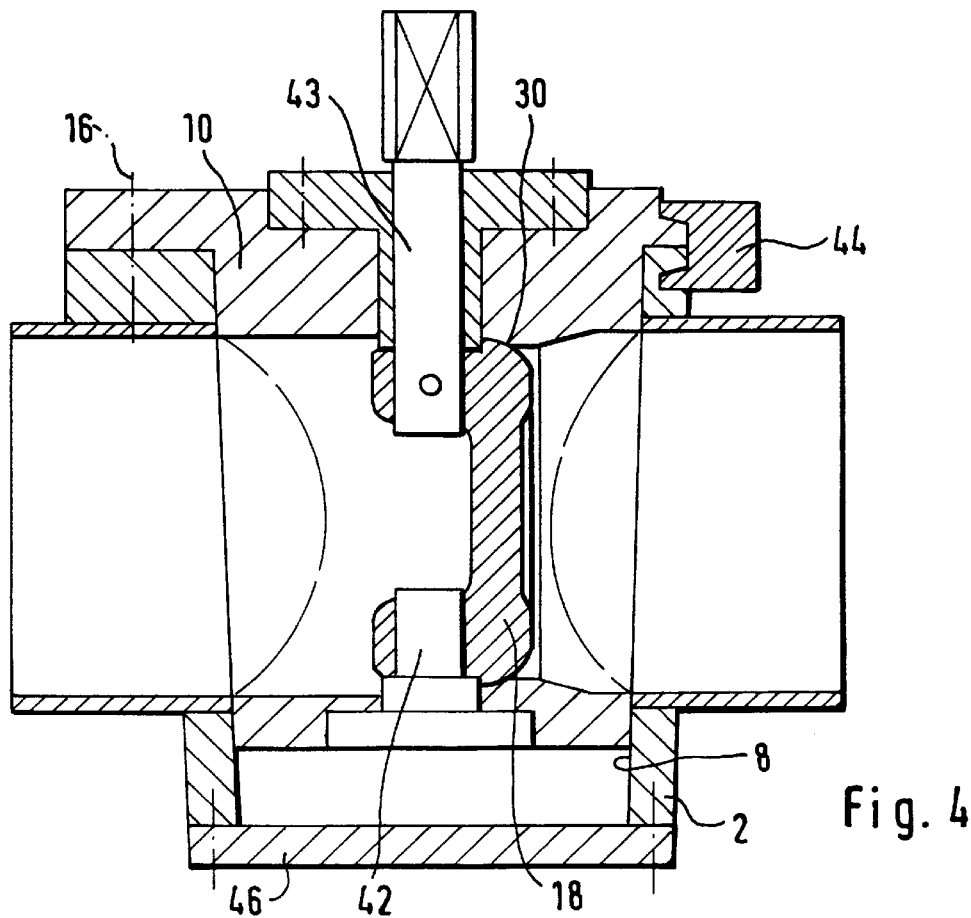
FIG. 4 shows an embodiment with a metallic seal between the inner and outer housings.

FIG. 4 shows another embodiment in which the shut-off element is again in the form of a gate 18, which is mounted at the bottom on a bearing pin 42 and at the top with a pivot pin 43 in the inner housing 10. In this embodiment a metal gasket is provided between the outer housing 2 and the inner housing 10. For this purpose the tapered inside surface of the cavity 18, preferably at least at the upper end, is accurately fitted to the tapered outside surface of the inner housing 10. The inner housing 10 is joined as needed to the outer housing 2 by screws, as indicated on the left by the broken line 16, or by a clamping ring 44 as indicated on the right side of the drawing. At the bottom end, the outer housing is sealed shut with a cover 46. The open design of the outer housing 2 makes it possible to precisely machine the inner surface or tapered cavity 8 without particular difficulty.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A pipe fitting configured as a control or shut-off valve, comprising:

a shut-off element pivotable about an axis, a housing comprising means for connecting the fitting to a pipeline, said housing being configured with an outer housing defining a cavity, and an inner housing which receives the shut-off element and is disposed in said cavity, said inner housing being releasably joined to said outer housing, a stem extending through said shut-off element, and a bearing which surrounds the stem disposed at least at one of upper and lower ends of the shut-off element, said bearing extending partially along said stem into the at least one of the upper and lower ends.

2. A pipe fitting according to claim 1, wherein said means for connecting comprise pipe nipples.

3. A pipe fitting according to claim 1, wherein the inner housing comprises a seat associated with the shut-off element.

4. A pipe fitting according to claim 1, wherein said bearing is one of a plurality of bearings, and wherein the inner housing contains the bearings for the rotatable shut-off element.

5. A pipe fitting according to claim 1, wherein the shut-off element is configured as a valve gate.

6. A pipe fitting according to claim 1, wherein the cavity of the outer housing has a conical configuration.

7. A pipe fitting according to claim 6, wherein the inner housing has a corresponding conical external shape over substantially its entire height.

8. A pipe fitting according to claim 1, wherein the outer housing and the inner housing are each provided with a flange which can be releasably joined to each other.

9. A pipe fitting according to claim 2, wherein the pipe nipples of the outer housing have free ends which can be connected to a pipeline by welding.

10. A pipe fitting according to claim 1, wherein a blank cover can be connected to the outer housing instead of the inner housing.

11. A pipe fitting according to claim 2, wherein the inner housing has an inside diameter which is substantially the same as the inside diameter of the pipe nipples.

12. A pipe fitting according to claim 8, wherein said means for connecting comprise pipe nipples, and the flange of the inner housing has a diameter which is greater than the outside diameter of the pipe nipples.

13. A pipe fitting according to claim 12, wherein the diameter of the flange of the inner housing is greater than the outside diameter of the pipe nipples by a factor in the range from 1.1 to 2.5.

14. A pipe fitting according to claim 13, wherein the diameter of the flange of the inner housing is greater than the outside diameter of the pipe nipples by a factor in the range from 1.2 to 2.

15. A pipe fitting according to claim 14, wherein the diameter of the flange of the inner housing is greater than the outside diameter of the pipe nipples by a factor in the range from 1.3 to 1.6.

16. A pipe fitting according to claim 2, wherein the outer housing has a height which is greater than the outside diameter of the pipe nipples.

17. A pipe fitting according to claim 16, wherein the housing height is greater than the outside diameter of the pipe nipples by a factor in the range from 1.1 to 1.8.

18. A pipe fitting according to claim 17, wherein the housing height is greater than the outside diameter of the pipe nipples by a factor in the range from 1.2 to 1.6.

19. A pipe fitting according to claim 1, wherein the outer housing is initially connected to the pipeline without the inner housing and closed by a blank cover, enabling checking of pipeline performance, and then the inner housing is inserted into and joined to the outer housing.

* * * * *